US008699397B2

(12) United States Patent
Wang et al.

(10) Patent No.: US 8,699,397 B2
(45) Date of Patent: Apr. 15, 2014

(54) METHOD AND APPARATUS FOR MULTIMEDIA BROADCAST MULTICAST SERVICES (MBMS) SERVICE FEEDBACK

(75) Inventors: Peter S. Wang, E. Setauket, NY (US); Janet A. Stern-Berkowitz, Little Neck, NY (US); Nobuyuki Tamaki, Manhasset, NY (US); Stephen E. Terry, Northport, NY (US); Kai Liu, S. Huntington, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 155 days.

(21) Appl. No.: 13/190,987

(22) Filed: Jul. 26, 2011

(65) Prior Publication Data

US 2012/0026929 A1 Feb. 2, 2012

Related U.S. Application Data

(60) Provisional application No. 61/368,541, filed on Jul. 28, 2010, provisional application No. 61/373,661, filed on Aug. 13, 2010.

(51) Int. Cl.
*H04W 4/06* (2009.01)

(52) U.S. Cl.
USPC ........................................... 370/312; 370/236

(58) Field of Classification Search
USPC .................... 370/312, 236, 390, 432
See application file for complete search history.

(56) References Cited

U.S. PATENT DOCUMENTS

| 8,059,572 | B2* | 11/2011 | Kim et al. | 370/312 |
| 2003/0224794 | A1* | 12/2003 | Kim et al. | 455/445 |
| 2004/0151133 | A1* | 8/2004 | Yi et al. | 370/312 |
| 2006/0176838 | A1* | 8/2006 | Lee et al. | 370/312 |
| 2007/0133449 | A1* | 6/2007 | Schacht et al. | 370/312 |
| 2008/0043658 | A1* | 2/2008 | Worrall | 370/312 |
| 2008/0165717 | A1* | 7/2008 | Chen et al. | 370/312 |
| 2008/0181161 | A1* | 7/2008 | Gi Kim et al. | 370/312 |
| 2008/0267109 | A1* | 10/2008 | Wang et al. | 370/312 |
| 2008/0273482 | A1* | 11/2008 | Lee et al. | 370/312 |
| 2008/0316952 | A1* | 12/2008 | Gruber et al. | 370/312 |
| 2009/0073911 | A1* | 3/2009 | Cheon et al. | 370/312 |
| 2009/0175212 | A1* | 7/2009 | Rey et al. | 370/312 |

(Continued)

OTHER PUBLICATIONS

Alcatel-Lucent Shanghai Bell et al., "Discuss on the UE MBMS reception status report," 3GPP TSG-RAN WG2 Meeting #70bis, R2-103686 (Jun. 28-Jul. 2, 2010).

(Continued)

*Primary Examiner* — Brian D Nguyen
(74) *Attorney, Agent, or Firm* — Volpe and Koenig, P.C.

(57) ABSTRACT

A method and apparatus are described for providing multimedia broadcast multicast services (MBMS) service feedback. A wireless transmit/receive unit (WTRU) may receive an MBMS service query message over an MBMS control channel and transmit an MBMS service response. The MBMS service query message and MBMS service response message may be radio resource controller messages. The MBMS service query message may include MBMS service identifiers which identify MBMS services that the WTRU is receiving or intending to receive. The WTRU may generate a report with MBMS service identifier index values, where each MBMS service identifier index value indicates a position of a service identifier corresponding to an MBMS service in the original query list that the WTRU is currently receiving or intending to receive. The MBMS service status query message may be received alone or along with a MBSFNAreaConfiguration message. The WTRU may respond within a predetermined or configured time limit.

18 Claims, 5 Drawing Sheets

(56) References Cited

U.S. PATENT DOCUMENTS

| | | | |
|---|---|---|---|
| 2010/0061286 A1* | 3/2010 | Ji et al. .......................... | 370/312 |
| 2010/0216454 A1 | 8/2010 | Ishida et al. | |
| 2010/0246429 A1* | 9/2010 | Hwang et al. ................. | 370/252 |
| 2012/0224523 A1* | 9/2012 | Reznik et al. ................. | 370/312 |

OTHER PUBLICATIONS

CMCC, "Clarifications on the reception status reporting in R10 MBMS," 3GPP TSG-RAN WG2 Meeting #70bis, R2-103964 (Jun. 28-Jul. 2, 2010).

Ericsson et al., "Counting for MBMS Rel-10," 3GPP TSG-RAN WG2 #70, R2- 103865 (Jun. 28-Jul. 2, 2010).

Huawei, "MBMS reception status reporting," 3GPP TSG-RAN WG2 Meeting #70bis, R2-103978 (Jun. 28-Jul. 2, 2010).

Huawei, "Proposed WID: Further enhancements to MBMS for LTE," TSG-RAN Meeting 48, RP-100691 (Jun. 1-4, 2010).

New Postcom, "Decision of MBMS service activation & deactivation," 3GPP TSG-RAN2#70bis, R2-103669 (Jun. 28-Jul. 2, 2010).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).

Third Generation Partnership Project, "Technical Specification Group Radio Access Network; Evolved Universal Terrestrial Radio Access (E-UTRA); Multiplexing and Channel coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.2.0 (Jun. 2010).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.2.0 (Jun. 2011).

ZTE, "Trigger Mechanism for MBMS Uplink Feedback," 3GPP TSG RAN WG2 #70bis, R2-103730 (Jun. 28-Jul. 2, 2010).

ZTE, "Uplink Feedback Approaches for MBMS," 3GPP TSG RAN WG2 #70bis, R2-103731 (Jun. 28-Jul. 2, 2010).

New Postcom, "Decision of MBMS service activation & deactivation," 3GPP TSG-RAN2#70bis, R2-103669 (Jun. 28-Jul 2, 2010).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.10.0 (Jun. 2010).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.14.0 (Jun. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.3.0 (Jun. 2010).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.7.0 (Jun. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).

* cited by examiner

METHOD AND APPARATUS FOR MULTIMEDIA BROADCAST MULTICAST SERVICES (MBMS) SERVICE FEEDBACK

CROSS REFERENCE TO RELATED APPLICATIONS

This application claims the benefit of U.S. provisional application No. 61/368,541, filed Jul. 28, 2010 and U.S. provisional application No. 61/373,661, filed Aug. 13, 2010, the contents of which are hereby incorporated by reference herein.

TECHNICAL FIELD

This application is related to wireless communications.

BACKGROUND

In long term evolution (LTE) Release 9 (R9), a core set of multimedia broadcast multicast services (MBMS) features and working mechanisms were specified to provide the MBMS services to the LTE wireless transmit/receive units (WTRUs). This core set enables the unidirectional point-to-multipoint transmission of multimedia contents, (e.g., public media or news service text, audio, sports or entertainment or television (TV) broadcast pictures or video), from a single source point to a multicast group of recipients in a multicast service area. In LTE R9, the multicast service is provided in a mixed cell environment.

A mixed MBMS cell supports both the regular unicast operations (regular WTRU service) as well as the MBMS operations using the time and frequency resources of the LTE cell. The unicast and the MBMS transmission operations are different, and therefore they are separated in a time division fashion as regular subframes and MBMS single frequency network (MBSFN) subframes. Thus, in the downlink (DL), the unicast data is not transmitted on any of the MBSFN subframes, and the MBMS service is not transmitted on any of the regular subframes.

In LTE R9, the MBMS system has no feedback information mechanisms provided or facilitated in order for the MBMS operator to obtain the actual MBMS service reception status and the service subscription status from MBMS-interested WTRUs. There is no provisioning of any uplink (UL) channels, UL MBMS messages, MBMS information elements (IEs) or MBMS signals to allow an MBMS WTRU to communicate with the MBMS service provider.

In LTE Release 10 (R10), MBMS feedback and reporting mechanisms are needed for the service provider to gather the information on what the MBMS-interested WTRUs and users' reception intentions are with respect to the general, and/or a set of, particular MBMS service broadcasts as well as what the MBMS services are that the WTRU/user is receiving at the time.

SUMMARY

A method and apparatus are described for providing multimedia broadcast multicast services (MBMS) service status feedback. A wireless transmit/receive unit (WTRU) receives an MBMS service status query message over an MBMS control channel and transmits an MBMS service status response. The MBMS service status query message and the MBMS service status response message may be radio resource controller messages. The MBMS service status query message may include a list of MBMS service identifiers, where the MBMS service identifiers may identify MBMS services that the WTRU is receiving or intending to receive. The WTRU may generate a report with MBMS service identifier index values, where each MBMS service identifier index value may indicate a position of a service identifier corresponding to an MBMS service in the original query list that the WTRU is currently receiving or intending to receive. The MBMS service status query message may be received alone or along with a MBSFNAreaConfiguration message. The WTRU may need to transmit the MBMS service status response message within a predetermined or configured time limit.

BRIEF DESCRIPTION OF THE DRAWINGS

A more detailed understanding may be had from the following description, given by way of example in conjunction with the accompanying drawings wherein.

DETAILED DESCRIPTION

Figure 1A:
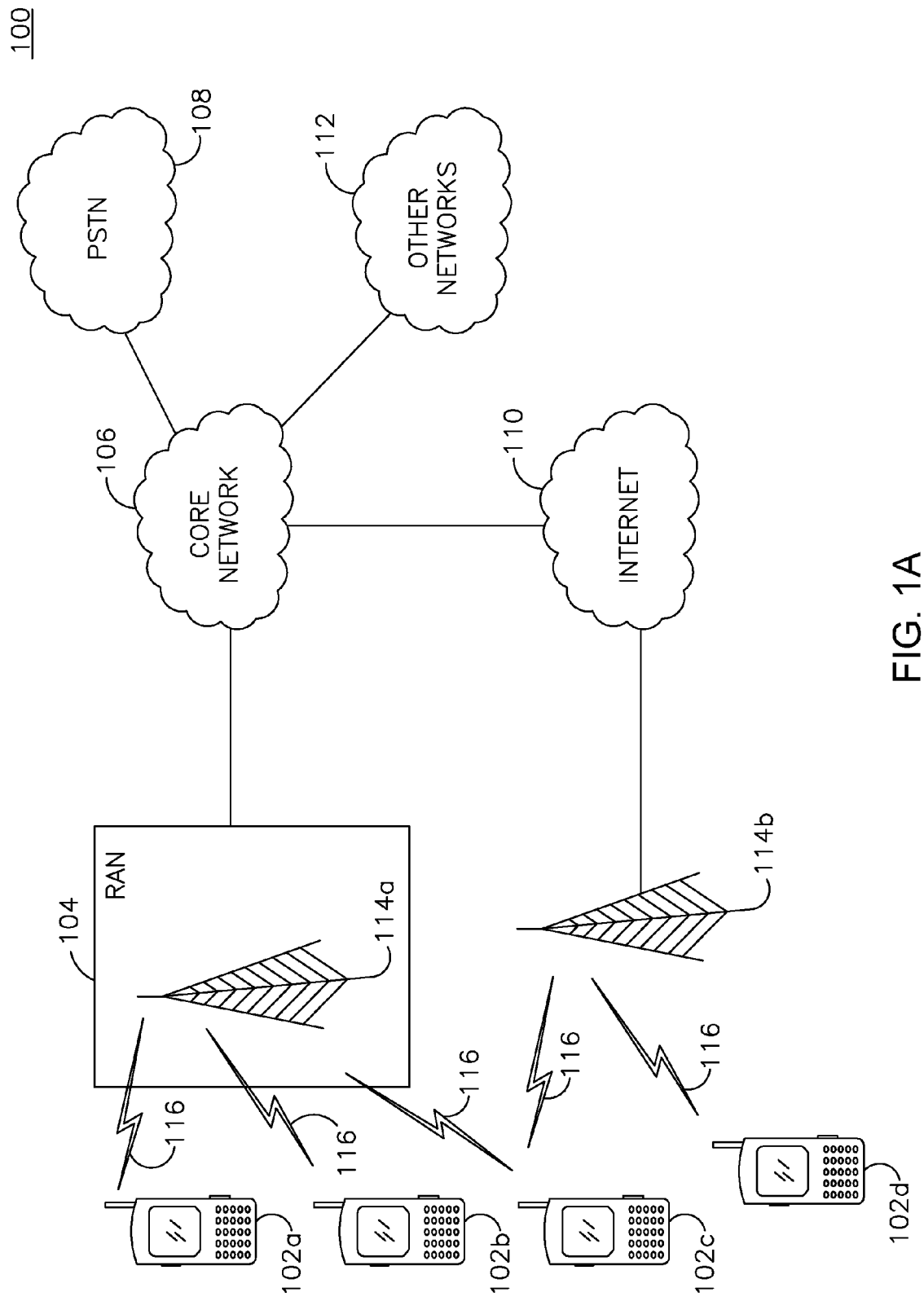
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
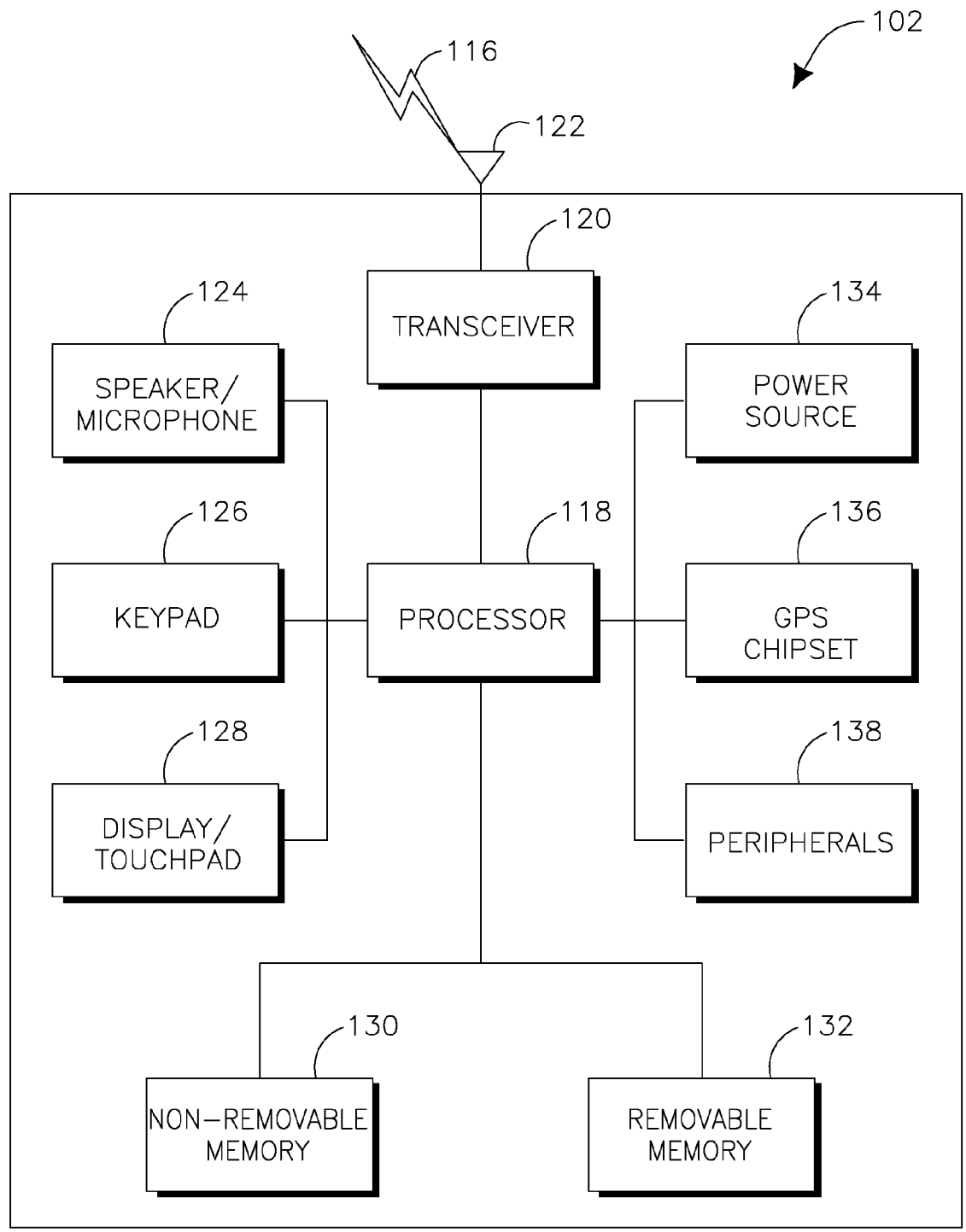
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
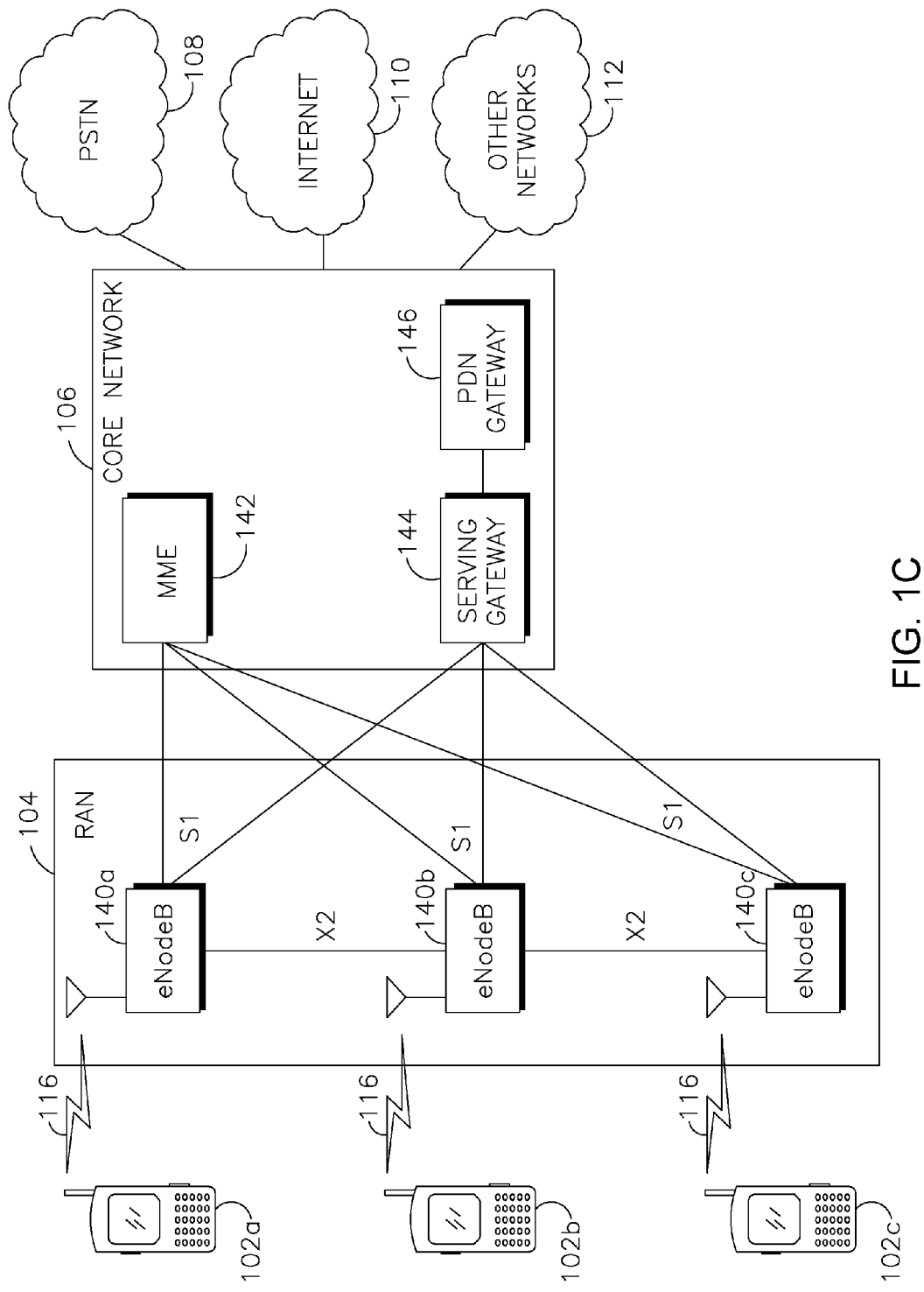
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Multimedia Broadcast Multicast Services (MBMS) are downlink (DL) services, where signaling or content data are transmitted on MBMS single frequency network (MBSFN) subframes. The available MBMS channels include a multicast control channel (MCCH) for control information, and multicast traffic channels (MTCHs) for MBMS service data transmission. Both the MCCH and the MTCHs are mapped on to the multicast channel (MCH) over the physical multicast channel (PMCH). The subframe structure of a PMCH is different than a regular unicast subframe in LTE.

In LTE Release 9 (R9) MBMS design there is no provisioning on uplink (UL) channels, messages or signals to allow MBMS-capable or MBMS-interested WTRUs to send any MBMS related information to the network operator. Hence the MBMS provider/operator may not be able to receive any feedback from the WTRUs.

From the MBMS user and the MBMS capable WTRU point of view, the MBMS user will first subscribe to the MBMS service through some means such as the regular telephone subscription service, the internet subscription service or other electronic program subscription services. The MBMS user may obtain the interested MBMS service information including the desired MBMS service identifications from the above subscription.

The MBMS services may mean particular television (TV) program/TV station content, a particular news or sports event, and the like. An MBMS user may subscribe to more than one MBMS service, each service represented by an MBMS service identification from the upper layer to the protocol operation in the access stratum.

For the MBMS-interested WTRUs in the reception operation, MBSFN subframes, MCH scheduling and transmit occasions, and MCCH channel control and scheduling configurations are determined from a system information block (SIB) type 13.

With a valid MBMS user subscription, the MBMS-interested WTRUs may then obtain the MBMS service announcement, service schedules and service data session to transmit channel (MTCH) mapping information through the MCCH channel via a radio resource control (RRC) message which may be called the MCCH message, and may also be known as an MBSFNAreaConfiguration message.

The MBMS-interested WTRUs further learn the service/MTCH scheduling arrangements up to the subframe detail via the MBMS Scheduling Information (MSI), which was previously referred to as dynamic scheduling information (DSI). The MSI may be transmitted in the beginning of each MCH scheduling period as a medium access control (MAC) control element (CE).

With the service specific channel scheduling and the modulation and coding scheme (MCS) known, the WTRU may receive and decode the subscribed MBMS service data at the appropriate MBSFN subframes from the MAC protocol data unit (PDU). The WTRU may then filter out the subscribed MBMS service data for the user according to its subscription and forward the desired MBMS service content to the user application.

Given these core set of MBMS features and mechanisms in LTE R9, LTE Release 10 (R10) and Release 11 (R11) include provisioning for the MBMS operator, (on the network side), to obtain the MBMS service status feedback information from the MBMS receiving WTRUs and the MBMS-interested WTRUs. This information fed back from the WTRUs, (sometimes called MBMS counting), may allow the operator to choose among activating, continuing or deactivating the MBSFN transmission for certain MBMS services in order to be more service efficient as well as to gain more service reception statistics. For example, if there are sufficient WTRUs receiving or interested in receiving a current MBMS service, the service may then begin or continue, otherwise it may be stopped.

For determining how many WTRUs are receiving currently ongoing MBMS services, the network may employ the current MCCH message MBSFNAreaConfiguration message for MBMS and include, for each service of interest, a report-indicator in the SessionInfoList information element (IE) of that message to solicit WTRU reports. A Boolean indicator (Yes/No) may be included for each service for which the network desires reception status. Ongoing services are only included in the MCCH. The request is for whether each WTRU receiving the MCCH is receiving the indicated service(s).

For controlling the total number of WTRUs reporting, either the network directly queries the WTRUs, or some filter technique such as a probability factor (backoff) scheme may be used.

For WTRUs reporting the MBMS service status, a WTRU service status report is per MBMS service, multiple service status' may be reported at a time, and the report may be constructed with respect to the service(s) listed in the MBSFNAreaConfiguration message.

A general WTRU mechanism for reporting may be a RRC message, a MAC CE, a layer 1 (L1) signal, or by forming MBMS service status IEs appended to RRC messages, however no details are known. The impact of such mechanisms on legacy devices should be minimized, (it may be tolerable if reception status of legacy devices stays unknown to the network). All of the new LTE R10 mechanisms should not impact the legacy WTRUs, (R8 or R9), MBMS capable or not. Other mechanisms may be used of if not backward compatible.

Described herein are high and detailed levels of MBMS service status feedback mechanisms, procedures, detailed organization of how the network may query the MBMS service status and how the WTRUs may respond/report to the network polls/requests/queries. Although two example approaches are described herein, the principles, mechanisms, procedures, methods and formats described herein may be interchangeable and reusable in both of the approaches and may be used independently of these approaches. Combinations of the disclosed methods, mechanisms, features or elements may be used in one or more embodiments.

In one example, a query and response approach may be used such that the network may query in the DL regarding some MBMS service reception related status and the relevant WTRUs may respond with status in the UL. In some cases, the response may need to be transmitted within a defined time frame. The queried status may include one or more of the ongoing MBMS service, the services to be transmitted in the near-future and the WTRU-subscribed MBMS services. The network may count the results received on the specific service reception status and/or the reception intention. In another instance, a base station may count the results received on the specific service reception status and/or the reception intention.

In another example, a general WTRU MBMS service status reporting approach may be used such that the MBMS-interested WTRUs may, in response to a network poll, report one or more of all their subscribed MBMS services, the services they are currently receiving and the services they are interested to receive. The MBMS service operator (or the network) may set the poll for one or more of these reports. The network may set the poll for the MBMS service status in order to adjust its MBMS service program plan. The MBMS-interested WTRUs may send their service status reports if the network has set the poll. The term "MBMS-interested WTRUs" may refer to those WTRUs that are currently receiving one or more of the active MBMS services and/or are currently monitoring the MBMS configuration occasions for the availability of the subscribed MBMS services.

Figure 2:
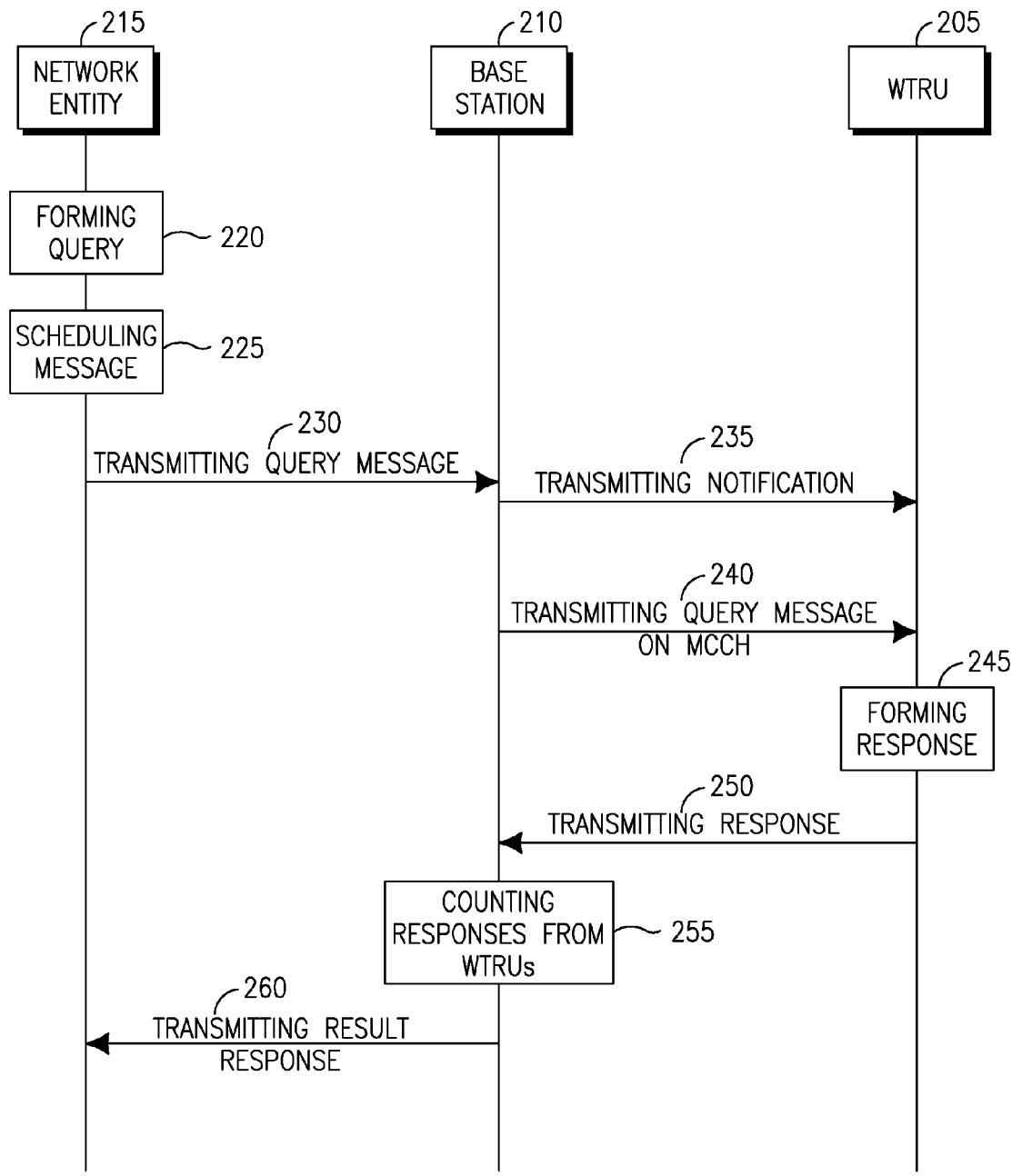
FIG. 2 shows a signal flow diagram for reporting multimedia broadcast multicast services (MBMS) service status.

FIG. 2 shows an example high level signal flow diagram for an MBMS service status feedback or reporting mechanism. As described herein, connected and idle mode WTRUs undergo different processing details but FIG. 2 illustrates generic processing performed in both modes. A wireless communication system 200 may include a WTRU 205, a base station 210 and a network entity 215 such as a multi-cell/multicast coordination entity (MCE). The network entity 215, in order to know whether or not it is appropriate to activate and deactivate certain MBMS services, may form (220), schedule (225) and send an MBMS service status query message to the base station 210 (230), which in turn may transmit a notification (235) followed by forwarding the MBMS service status query message over the MCCH to the WTRU 205 (240). The WTRU 205 may then prepare (245) and transmit an MBMS service status response to the base station 210 (250). The base station 210 may then collect and count the responses from each of the responding WTRUs (255) and may then transmit a result response to the network entity (215) (260).

Described herein are details with respect to the query and response approach. Specifically, network queries and WTRU reports on MBMS service status are disclosed herein. For LTE MBMS service for R10 and beyond, the network MBMS operator may query the WTRUs for the status of some MBMS services for feedback information and the WTRUs may then respond to the query with their MBMS reception or intention status.

Described herein are MBMS service query categories for the query and response approach. These queries may be useful to a network supporting MBMS or to a network MBMS operator to determine when or whether to start, continue, or stop certain MBMS services for transmission or for program adjustment. Although the term network MBMS operator is used in the examples herein, the term may refer to network entities that may have need for MBMS feedback information.

One or more of the following categories of MBMS service status may be queried by the MBMS operator (hereafter query-category). An example query-category may be "which of the MBMS services that are currently being actively transmitted are the WTRUs currently receiving." Another example query-category may be "which of the MBMS services that are to be transmitted in the near future are the WTRUs intending to receive." The MBMS services may include those that are currently being transmitted and/or those that are not being currently transmitted. Another example query-category may be "which of the MBMS services are subscribed by the MBMS-interested WTRUs." Another example query-category may be "which of the MBMS services were serviced and received by a WTRU within a certain period of time in the past." Other query-categories may be used along with different terminology and query formulation. For example, the terms in the above example query-categories may be interchanged and combined in different ways.

Described herein are methods and mechanisms for MBMS service status query by the network. When necessary, the network MBMS operator may transmit a query message or a service query IE to the MBMS WTRU population.

The query may include one of more of the following items. For example, the query may include a list of the MBMS services for which the current reception status of the WTRUs may be requested. The list of MBMS services may be identified by their service identities (service-IDs) or the like, for example. In another example, the query may include a list of the MBMS services with their respective querying category indicator for which one or more of the current reception status, intended reception status, and subscription status of the WTRUs may be requested. The list of MBMS services may be identified by their service-IDs or the like, for example.

In another example, one or more service query category indicator(s) may be included in the query for which MBMS service status of the WTRUs may be requested. In this case, service -IDs or equivalents may be omitted from the request.

In another example, one or more service query category indicator(s) with each associated with, (i.e. followed by), a list of MBMS services for which the WTRUs MBMS service status for each of those services may be requested with respect to the specific category(s) of status. The list of MBMS services may be identified by their service-IDs or the like, for example.

The MBMS service query may also include other related parameters that may help to refine the query and the WTRU response. This may include one or more of the following. For example, the MBMS service query may include a time-scope parameter such as a validity timer within which the WTRUs responses are requested to be sent and may be sent by the WTRUs to the network. In another example, the MBMS service query may include a time-scope parameter for how far back in time the WTRUs should report the requested status if the request is for (or to include) past history status.

In another example, the MBMS service query may include an area-scope parameter such as a MBSFN-area or some other area definition within which a WTRU response may be sent. In another example, the MBMS service query may include a specific query tag number or a query-ID that the WTRUs may include in the response to identify the targeted response information. In another example, the MBMS service query may include a form of time-stamp or indicator that the WTRUs may include in the response to identify the targeted response information.

In another example, the MBMS service query may include a quality parameter querying for the reception quality, such as signal strength, signal quality, or the reception error rate report, either related with a relevant MBMS service or as an aggregated value for the WTRU MBMS reception. In a variation of this example, a quality threshold value related to the above quantities may be included such that the WTRUs are requested to report the additional feedback for services being received either above or below the threshold.

The MBMS service query may also include a filtering parameter in order to limit the service query response volume generated by the responding WTRUs. An example of such a parameter may be a number N such that the WTRU-ID relationship to the value of N determines if and/or when the WTRU responds to the request. As an example, if N is an integer greater than or equal to 1, the determination as to when a WTRU responds to the query may be the WTRUs with their WTRU-ID mod N=(N−1) may not send query responses or only the WTRUs with their WTRU-ID mod N=(N−1) may send responses.

In another example, the WTRU-ID modulo the value of N may determine in what subframe the WTRU may reply to the request.

Described herein are methods, mechanisms and messages that may be used for MBMS service query transmission in the downlink. Specifically, the MBMS service status query may be transmitted to the MBMS-interested WTRUs in one or more of the following mechanisms or forms.

For example, a new RRC message "MBMS Service Status Query" may be sent over the MBSFN subframes over the MCCH for the query. The RRC message may be scheduled the same or differently than the MBSFNAreaConfiguration message and may be transmitted in the scheduled MBSFN subframes in the cell. Alternatively, the MBMS Service Status Query may be scheduled to be transmitted over the MBSFN subframes over the MCCH periodically in a span of time, (pre-determined or configured), when necessary. Alternatively, the query message may be scheduled to transmit with the same periodicity as the MBSFNAreaConfiguration message as well as the same frame offset and the same subframe number configurations, (to save signaling space overhead). In the case where the existing MBSFNAreaConfiguration message may be transmitted simultaneously with the new query message, the MBSFNAreaConfiguration precedes the new query message in order to not impact the legacy WTRUs.

In another scheduling example, the query message may be scheduled to transmit with the same periodicity and the same offset as the MBSFNAreaConfiguration message but a different subframe number. In another scheduling example, the query message may be scheduled to transmit with the same periodicity and the same subframe number(s) as the MBSFNAreaConfiguration message but a different frame offset. In another scheduling example, the query message may be scheduled to transmit with a different periodicity from the MBSFNAreaConfiguration message, with a same or different frame offset but the same subframe number.

In another mechanism, a new MBMS radio network temporary identity, for example an MBMS query ((MQ)-RNTI), may be added to the physical downlink control channel (PDCCH) such that it indicates the coming of the new MBMS service status query message in the next modification period or a predefined time boundary, (shown in FIG. 2 as transmitting notification (235)). For the MQ-RNTI, the DL control information (DCI) format 1C may be used in a way similar to the MBMS RNTI (M-RNTI). Other formats with the similar M-RNTI approach may also be used. The MQ-RNTI may be used to scramble the cyclic redundancy check (CRC) of the DCI format.

In one example, the MQ-RNTI may contain a MBSFNArea bitmap, and one or more bits in the bitmap may indicate the corresponding MBSFNArea or MBSFNAreas that the query is coming from and for. In another example, the MQ-RNTI may be used alone as a direct query to the MBMS-interested WTRUs. That is, the MQ-RNTI DCI, (e.g. in format 1C or one of the other formats), may carry one or more of the querying MBMS service-ID(s) or their equivalence and the query-categories. In another example, the MQ-RNTI may be used for a query of one or more specific query-categories or for a poll of a general status query, both of which are further discussed herein.

The MQ-RNTI DCI may be scheduled with a periodicity, a frame offset and a subframe number so the WTRUs may know where to monitor the MQ-RNTI.

For example, the MQ-RNTI may be scheduled to transmit with the same periodicity, the same frame offset and the same subframe number as for M-RNTI in order to save the network signaling of the MQ-RNTI scheduling parameters, i.e., the periodicity, offset and the subframe number, and to minimize WTRU operational overhead.

Alternatively, the MQ-RNTI may be scheduled to transmit with the same periodicity and the frame offset of the M-RNTI, but with a different subframe number. The subframe number for the MQ-RNTI may be explicitly specified in the network signaling or it may be pre-determined as setting to the next MBSFN subframe to the one for M-RNTI or a different offset number. For example, in M-RNTI scheduling, the calculation involving the periodicity and the offset may yield a frame number, (a frame may contain 10 subframes). Among the 10 subframes in the frame, as many as 6 subframes may be assigned for MBMS usage, (also called MBSFN subframes). These MBSFN subframes are hence available to M-RNTI and MQ-RNTI transmission. For illustration purposes only, if subframes #1, #2, #3, #6, #7 and #8 may be assigned for MBSFN subframes and the M-RNTI may be transmitting in subframe #2, then the MQ-RNTI may be transmitted in subframe #3.

In another mechanism, the M-RNTI usage may be modified to serve as notification for the coming of a MBMS service status query message (shown in FIG. 2 as transmitting notification (235)). One of the following methods may be used.

For example, an additional bit may be defined in the M-RNTI PDCCH DCI format, (e.g., format 1C), reserved information bit area, to indicate whether the M-RNTI signal may be meant for the coming of an MBMS service status query, (in this way the M-RNTI may service as notification for both the query and the area configuration change).

In another example, the existing M-RNTI DCI format (e.g., format 1C) may be used, where all the bits in the current MBSFN-area-ID-bitmap may be set to a uniform value, i.e., the bitmap bits may be set to all '0's or to all '1's. In this case the exiting format may be reused given that notification for both query and configuration change would not be happen at the same time.

In another mechanism, the MQ-RNTI as defined herein, which may be read by LTE R10 or above MBMS WTRUs, may alternatively be used to indicate the coming of the MBSFNAreaConfiguration message with additional MBMS service status query parameters for the purpose of the MBMS service status query. In such a setting, the legacy WTRUs would not be affected even if the MBSFNAreaConfiguration message changes for the MBMS service status query.

The MQ-RNTI may have one or more of the following MQ-RNTI content. In one example, the MQ-RNTI DCI may contain a MBSFN-Area-bitmap, where one or more bits in the bitmap may indicate the corresponding MBSFN Area(s) that the query (or the message change described herein) is coming from and/or for.

In another example, the MQ-RNTI DCI may contain an indicator to indicate whether the original content of MBSFNAreaConfiguration, i.e., those that are not MBMS service query related, is to change or not. In this case R10 or above MBMS WTRUs may read the MQ-RNTI.

In another example, the indicator may be used together with the bitmap such that the indicator bit (or bits) indicates whether it is an MBMS service query, (e.g., a value of '1', or '0'), a MBSFN area configuration, (e.g., a flip value of '0' or '00') or both (e.g., a value of "11" or a total absence of the two indicator bits). The position of the bits in the bitmap may then indicate which MBSFN area(s) the query and/or the configuration may be applicable for.

In another example, in case both query and configuration changes are indicated, separate bitmaps may be used to indicate the MBSFN area(s) to which the query and the configuration change applies.

In another mechanism, the changes disclosed herein for M-RNTI and the DCI may, alternatively be used to indicate the coming of the MBSFNAreaConfiguration message, (with additional MBMS service status query parameters), for the purpose of MBMS service status query.

For example, LTE R10 or above MBMS WTRUs, when reading the modified M-RNTI DCI format, may recognize, (for example via the additional bit or the uniform bit value setting of the bitmap in the DCI), that M-RNTI DCI indicates the MBMS service status query in the MBSFNAreaConfiguration message and may acquire the message to learn about the MBMS service status query. Legacy WTRUs may not recognize the modified DCI format and may not acquire the MBSFNAreaConfiguration message. WTRUs not acquiring the message would not be affected by the network initiated MBMS status query action.

In another mechanism, a new RRC IE or new IEs for the MBMS service status query may be defined. The IEs may be appended to the existing MCCH message MBSFNAreaConfiguration when the network wants to query the WTRUs for the MBMS service status such as for example, subscription, current reception, and intended reception.

In this case, the MBMS-service-query IE(s) may be included in the MCCH message MBSFNAreaConfiguration and the M-RNTI may notify the MBMS-interested WTRUs about the MCCH message change. In response, the MBMS-interested WTRUs may read the new MCCH message MBSFNAreaConfiguration and learn and/or determine the nature of the query.

The new MBMS Service Status Query IE may be arranged or defined in the Abstract Syntax Notation One (ASN.1) format of the MBSFNAreaConfiguration such that if there are no query contents, the section or part may be left empty.

The new IE(s) may include the service identities or their equivalents for the MBMS services queried for "near future receiving interest" and for "subscription status". It may, but need not, include the MBMS services that are already listed in the MBMS-SessionInfoList IE of the MBSFNAreaConfiguration message since they are already included. In case the service identities or equivalents have values that are numerically consecutive within a range, then the compact signaling method described herein may be used.

The new IE(s) may include status query indicators for each of the queried services, for a group of services, or for all of the services.

The new IE(s) may include the status query category indicator for the MBMS services listed in the existing IE MBMS-SessionInfoList.

In another mechanism, a new MAC CE may be defined for the transport of the MBMS service query. The MBMS service query may be transmitted as a MAC CE DL in the MBSFN subframes in one or more of the following ways. For example, the MBMS Query MAC CE may be transmitted on any of the MBSFN subframes in which there is MCCH and/or MTCH transmissions.

In another example, the MBMS Query MAC CE may be scheduled to transmit with a periodicity, e.g., a MCH subframe allocation pattern (MSAP) period, or a longer period. It may be transmitted in the first subframe or last subframe of the period or a special offset, (predetermined or configured), in the period. Alternatively, it may be transmitted in the subframe right after the last MTCH transmission subframe in the period. Alternatively, it may be transmitted together with the last MTCH transmission (subframe) of that period.

When the MAC CE for the MBMS service status query is transmitted, the whole MBSFN subframe may be encoded using the signaling MCS defined in SIB 13.

In another mechanism, a new type of paging may be defined to transport the MBMS service query. A new RNTI, e.g., an MBMS paging (MP)-RNTI may be defined to indicate the coming of this new type of paging message. The MP-RNTI may use DCI format 1A or any other applicable format. It may identify a type of paging message for the purpose of notifying that a MBMS Service Query message is coming in the transmission in the same transmission timing interval (TTI).

The new type of paging message may be triggered by a multi-cell/multicast coordination entity (MCE) and received by all MBMS interested WTRUs under a MBSFN area. This may allow the network to query the WTRUs that do not currently listen to the MCCH channel and/or are currently not monitoring the MBSFN subframes. The new type of paging message may be transmitted at normal paging occasions or at a subset of the normal paging occasions when necessary, as a part of the regular paging message. That is, the new type of paging message may appended to the regular paging message if both are transmitted in the same TTI.

The paging message may carry the RRC IE(s) defined herein for MBMS service status query. The paging message query may be most useful for the MBMS services that are to be transmitted in the near future and may be restricted to that use. WTRUs subscribed for MBMS services may respond to this page using the mechanisms described herein indicating their interest in receiving such an MBMS service in the near future.

The paging message may, instead of including the query, indicate to the WTRUs to listen to the MCCH channel in order to respond to a query that will be coming on the MCCH. WTRUs may respond to the page by reading the MCCH at the appropriate time and responding to the query.

The MP-RNTI format 1A DCI reserved field, (e.g., the "HARQ process number"), may be used to indicate to the WTRUs to listen to the MCCH channel in order to respond to a query that will be coming on the MCCH. WTRUs may respond to reception of the MP-RNTI by reading the MCCH at the appropriate time and responding to the query.

Described herein are mechanisms for compact service identity list signaling. If the values of the querying service identities or their equivalents are numerically consecutive within a range, then the service ID list may be represented by one of the following signaling methods. For example, a start service ID value plus a range value may be used. In this case, a starting service-ID value of 5550 and a range value of 20 may indicate the consecutive service identities 5550 and 5551 to 5570. In another example, a start service ID value plus a bitmap in the signaling may be used. The consecutive bitmap bit positions may represent the consecutive service ID values counting up from the Start service ID value, where a "1" position value in the bitmap may represent a query on the service by the derived ID value. In this case, a start service-ID value of 5550 and a bitmap <from left to right>"1100110011001100" may indicate the querying of the services with IDs 5550, 5551, 5552, 5555, 5556, 5559, 5560, 5563, 5564.

Described herein are mechanisms and methods for WTRU reception of the MBMS service status query. MBMS interested WTRUs may need to monitor one or more of the following query indicator occasions or query message occasions in order to find out about and receive the query and respond to the query if necessary.

In one mechanism, if the MQ-RNTI may be defined to indicate the MBMS service status query in the MBSFNArea-Configuration message, the WTRU may monitor the MBSFN subframes for occurrences of the MQ-RNTI, and if the MQ-RNTI is found, the WTRU may proceed to receive the MBSFNAreaConfiguration message to learn about the query details.

In another mechanism, if the M-RNTI is modified as described herein, and also defined to indicate the MBMS Service status query in the MBSFNAreaConfiguration message, the WTRU may monitor the M-RNTI. If the M-RNTI is found and it indicates the MBMS service status query in the MBSFNAreaConfiguration message, the WTRU may proceed to receive the MBSFNAreaConfiguration message to learn about the query details.

In another mechanism, if the new MBMS service status query message and the MQ-RNTI are defined to indicate the coming of the new message, the WTRU may monitor the MBSFN subframes for the occurrences of the MQ-RNTI and if the MQ-RNTI is found, the WTRU may proceed to receive the MBMS service status query message to learn about the query details. In case the MQ-RNTI DCI format carries the querying service list (e.g., identities) and/or query categories directly, the WTRU may consider the query message acquisition as complete.

In another mechanism, if the new query message is defined and the M-RNTI is defined to indicate its transmission, the WTRU may look for the M-RNTI over the MBSFN subframes and if the M-RNTI is received and the new query bit is set in the DCI format or, alternatively, if the M-RNTI is received and the DCI format bitmap bits are all set with a uniform value, the WTRU may understand the new query message is to be transmitted. The WTRU may proceed to acquire the new query message.

In another mechanism, if the new query IE(s) is defined in the MBSFNAreaConfiguration message and the M-RNTI is used to indicate its transmission, the WTRU may look for the M-RNTI over the MBSFN subframes and if the M-RNTI is received and the new query bit is set in the DCI format or, alternatively, if the M-RNTI is received and the DCI format bitmap bits are all set with a uniform value, the WTRU may understand the new IE(s) in the message to be transmitted. The WTRU may proceed to acquire the new query IE(s) from the MBSFNAreaConfiguration message.

In another mechanism, if the new MAC CE for querying service status is defined, the WTRU may monitor the MBSFN subframe occasions for the new MBMS service status query MAC CE transmissions.

In another mechanism, if the new MP-RNTI and the query IE in the paging message are defined, the WTRU may monitor the regular paging occasions, (or a subset of them), for the occurrence of the MP-RNTI. If the MP-RNTI is found, the WTRU may proceed to retrieve the querying IEs in the paging message.

In another mechanism, if the new MP-RNTI is defined and the paging message indicates the query will be in an upcoming MCCH, the WTRU may monitor the regular paging occasions (or a subset of them) for the occurrence of the MP-RNTI. If the MP-RNTI is found, the WTRU may proceed to read the paging message and if it indicates a query will be in an upcoming MCCH, the WTRU may proceed to acquire the query from the MCCH.

In another mechanism, if the new MP-RNTI is defined and it indicates the query will be in an upcoming MCCH, the WTRU may monitor the regular paging occasions (or a subset of them) for the occurrence of the MP-RNTI. If the MP-RNTI is found, the WTRU may proceed to acquire the query from the MCCH.

Described herein are methods for WTRUs to generate query responses and examples of response formats. If a WTRU receives an MBMS service status query, it may generate a query response message, the query response information elements or a query response MAC CE with respect to the queried MBMS services associated with the query based on its current MBMS service status. The WTRU's response may be or include one or more of the following response types.

In an example response, if a service query category is marked on a particular MBMS service, a group of the services or all of the services in the query or the query category are understood by the WTRU, where the WTRU response for a particular service may be an Yes or No. This may be represented by a 1-bit YES/NO indicator. In this case, if the category is "subscribed" and the query includes a list of services or group(s) of services, based on the WTRU's subscription, it may respond Yes or No for each service.

In another example response, if one or more services are queried to the WTRU with no specific query category attached, then in response, the WTRU may include a service-status-indicator for the queried services. This service-status-indicator may be defined similar to the service query category. For example, the values may be one or more of: 1) It is not-subscribed or do-not-care; 2) It is subscribed; 3) It is currently receiving (implies it is also subscribed); 4) It is "interested in receiving"(also implies subscribed); 5) a WTRU that has subscribed to the MBMS service may also be considered to be "interested in receiving" the service; 6) Not receiving or alternatively, the value for subscribed may be used to mean subscribed and not receiving; and 7) Not interested in receiving or alternatively, the value for subscribed may be used to mean subscribed and not receiving and not interested in receiving. In this case, the WTRU may generate a service-status-indicator either to all services listed in the query or only to those services relevant to the particular WTRU, (e.g. those services to which the WTRU has subscribed, the WTRU is interested to receive or the WTRU is currently receiving).

In another mechanism, if a query response time limit is predetermined or configured, the WTRU may need to generate and transmit the response within the defined time limit. The WTRU may not respond if the time limit is over.

In another mechanism, the WTRU may only generate a response within the configured area-scope if the area-scope is predetermined or configured.

In another mechanism, the WTRU may need to respond to other querying parameters such as the query tag number associated with it if it is configured.

In another mechanism, the WTRU may perform the filtering procedure to determine if it needs to generate a response if the filtering parameter is configured.

In another mechanism, a WTRU may not need to respond to the query at all if the WTRU does not have any positive response status indication with respect to the queried services. For example, if the request is for reception status for a list of services that the WTRU is not receiving, then the WTRU may not respond to the request since all status indications would be No.

In another mechanism, the WTRU may include other parameters in the response such as quality information (if requested or required), WTRU location information (if requested or required), and the like.

Some further details and examples are given here on the procedures the WTRU may use to generate the query response based on how the query is formed. One or more of the following may be applicable in addition to the response types described herein.

In an example, for a list of MBMS services, (which may be indicated by the service-ID or their equivalents), queried without any query category, the WTRU response may include the service-ID or equivalents along with the service-status-indicator for the service, i.e., if the WTRU is currently receiving an MBMS service, then the WTRU may include a currently receiving indicator for the service ID.

For the above example, the WTRU may also employ one or more of the following optimization techniques to the service-ID and status-value pair. Using one optimization technique, the WTRU may generate and report only a list of the service-status-indicators in the order of the service identities, (hence to the corresponding services), in the original querying list, (the service-ID being implied by its position in the original querying list).

Using another optimization technique, the WTRU may generate and report a service-ID-index and a service-status-indicator pair. The service-ID-index value indicates the position of the service-ID (hence the service) in the original querying list. In this way, the WTRU may skip responding to some of the services if they are irrelevant to the WTRU. In other words, the WTRU may generate a report that has service-ID-indices or service-ID-index values, where service-ID-indices or service-ID-index values may be used interchangeably. The WTRU may skip the service-status-indicator if it is clearly implied in the query.

Using another optimization technique, the WTRU may generate and report a bitmap with ordered positions corresponding to the services (or service-IDs) in the original querying list. Each "1" position in the bitmap will have a service-status-indicator associated to it as the response to the relevant queried services.

In another example, for a list of MBMS services, (for example indicated by the service-ID or its equivalents), queried with a specific query category, the WTRU response may include the service-ID or equivalence and a YES/NO indicator to the queried service. The WTRU may also employ one or more of the following optimization techniques for this example. Using a first optimization technique, the WTRU may generate and report only a list of the YES/NO indicators in the order of the service identities, (hence to the corresponding queried services), in the original querying list, to optimize the signaling efficiency.

Using another optimization technique, the WTRU may generate and report a service-ID-index and a YES/NO indicator pair. The service-ID-index value indicates the position of the service-ID (hence the service) in the original querying list. In this way, the WTRU may skip responding to some of the services if they are irrelevant to the WTRU.

Using another optimization technique, the WTRU may generate and report a bitmap with ordered positions corresponding to the services (or service-IDs) in the original querying list. Each "1" position in the bitmap will have a YES/NO-indicator associated to it as the response to the relevant queried services.

In another example, for a query consisting of one or more query categories without service identifiers or equivalents, the WTRU may include the query-category indicator followed by the service identities (or equivalents) that the WTRU is currently having a positive status for the query-category, i.e., if the query-category is for services currently being received, the WTRU would provide the service identities for the services it is currently receiving. In case there is only one query-category in the query, the WTRU may just provide those service identities with the positive status.

In another example, for a query consisting of one or more query categories followed by a list of service identities for each category, the WTRU may include the query-category indicator followed by a list of the service identities (or equivalents) in the report and the YES/NO-indicators, which may be in the order of the service identities in the querying list. The WTRU may also employ one or more of the following optimization techniques for the list of the service-ID and the YES/NO indicator pairs. Using a first optimization technique, the WTRU may generate only a list of the YES/NO indicators in the order of the service identities, (hence corresponding to the queried services), in the original querying list.

Using another optimization technique, the WTRU may generate a list of the service-ID-index and the YES/NO pairs. The service-ID-index value indicates the position of the service-ID (hence the service) in the original querying list.

Using another optimization technique, the WTRU may generate a bitmap with ordered positions corresponding to the services (or service-IDs) in the original querying list. Each "1" position in the bitmap may have a YES/NO-indicator associated with it as the response to the relevant queried services.

Described herein is a security signature that may be used in the WTRU query response. For security reasons with the idle mode WTRUs, (and may include connected mode WTRUs), responding to the MBMS service status query, service status polling or any form of MBMS feedback information, a credential signature for the WTRU, (represented by a form of WTRU-ID), for the MBMS-user, (represented by a form of MBMS service subscriber ID), or a combination of the two identities, may be created as an IE with proper encoding. The WTRU may include this credential IE in the UL response message, the response IE(s) or even in the response MAC-CE. This may help the MBMS operator identify the WTRU and/or the MBMS subscriber ID.

Described herein are WTRU response mechanisms to the MBMS service status query. The WTRU may use one or more of the following UL mechanisms to transmit the WTRU MBMS service query response.

In one mechanism, a new specific UL message in non-access stratum (NAS) or RRC may be defined. For a WTRU in connected mode operation, the WTRU may send the NAS or RRC message at any time during the WTRU's RRC_CONNECTED state operation for the purpose of a query response. A network response in this case is not required.

For a WTRU in idle mode to report to the query response, the WTRU may piggyback the NAS message in conjunction with the LTE RRCConnectionSetupComplete message, (like a NAS attach), after the idle mode WTRU establishes a RRC Connection. The base station may dispatch or forward the NAS part, (the query response), to the MCE or to the MBMS service node.

The WTRU may send the RRC message after the RRC Connection is established using one of the following methods. In one method, the WTRU may piggyback it to the RRCConnectionSetupComplete. In another method, the WTRU may replace the RRCConnectionSetupComplete message with the RRC message which includes the MBMS service query response. In another method, the WTRU may send it to the network as a separate message after, (for example right after), sending the RRCConnectionSetupComplete message.

If the reason for the RRC connection was solely for the sending of the MBMS query response, the base station may then release the RRC connection after the response is received. The base station may be responsible for forwarding the query response to the MCE.

In another mechanism, a RRC level IE(s) may be defined for the MBMS service query response. For connected mode WTRUs reporting responses, the WTRU may include IEs in any of the RRC UL messages that support the query-response-IE as soon as the response is formed and there is a supporting UL RRC message. For example, the uplink RRC messages that may carry the response IEs may include the RRCConnectionReconfigurationComplete, RRCConnectionReestablishmentComplete, RRCConnectionSetupComplete, UECapabilityInformation, MeasurementReport messages and the like.

For idle mode WTRUs reporting responses, the WTRU may include the response IE in the RRCConnectionSetupComplete message. In conjunction with this method or other methods, a new cause code for the WTRU to "report MBMS status" may be defined. The idle mode WTRU may use this cause code in the RRCConnectionRequest message to indicate that the connection establishment may be for MBMS service query response purposes.

The WTRU may include the formatted query response IEs in the RRCConnectionSetupComplete message to the network. The base station may thus know, (from the cause code), that the connection establishment and the message or the IE may be used for reporting the MBMS service query response. The base station may release the RRC connection after forwarding the query response to the MCE.

Figure 3:
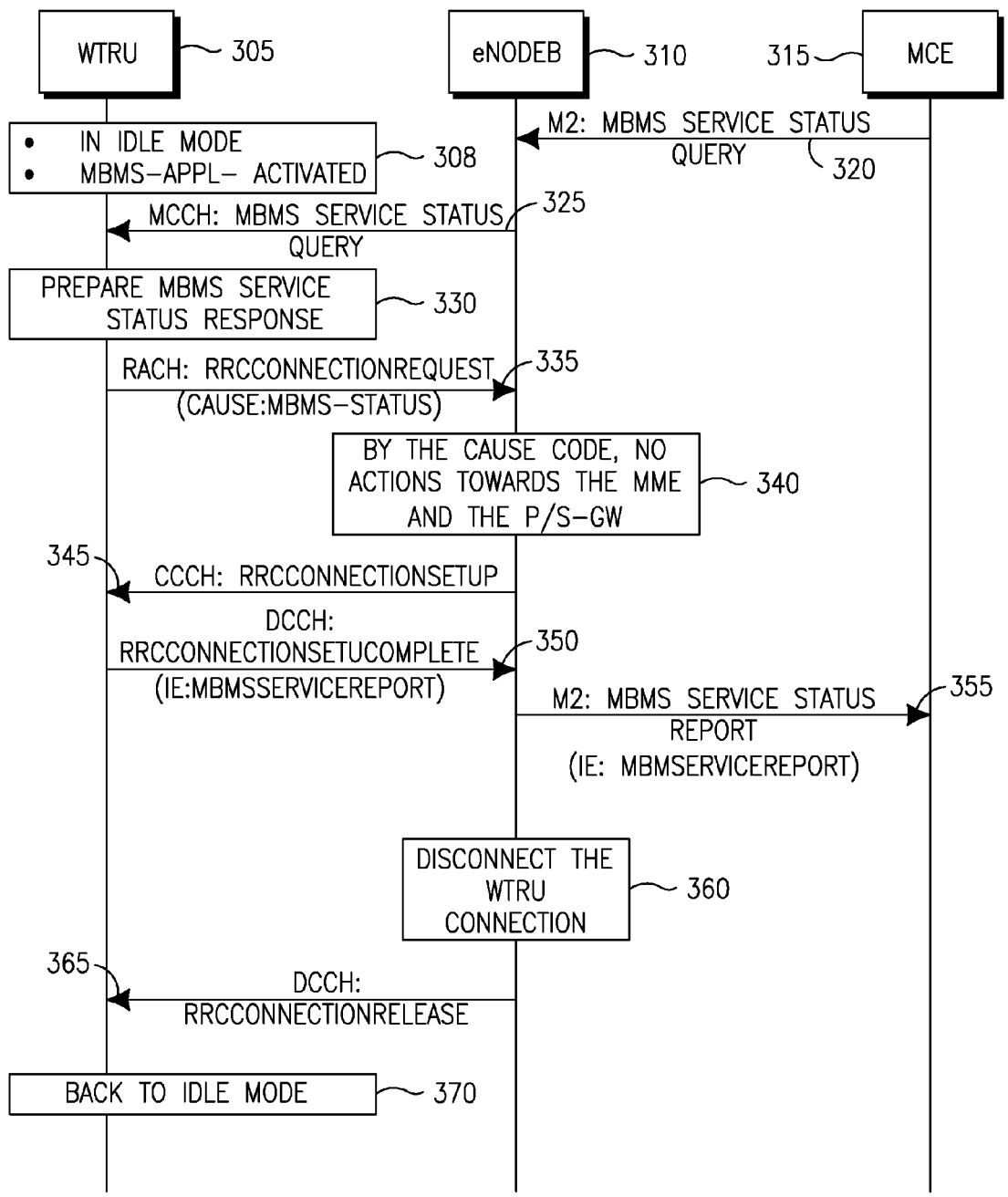
FIG. 3 shows a signal flow diagram for reporting MBMS service status for an idle mode WTRU.

FIG. 3 shows an example signal flow diagram for idle mode WTRU reporting MBMS service status. A wireless communication system 300 may include a WTRU 305, a base station 310 and an MCE 315. The WTRU 305 is in idle mode and has an active MBMS application 308. The MCE 315 may send an MBMS service status query message to the base station 310 (320), which in turn may forward the MBMS service status query message over the MCCH to the WTRU 305 (325). The WTRU 305 may then prepare an MBMS service status response 330, and send an RCCConnectionRequest message over the random access channel to the base station 310 (335). The cause identified for this request may be the "report MBMS status" code or something similar. As a result of the cause code, the base station 310 may take no action towards the Mobility Management Entity (MME) or the packet data network gateway/the serving gateway P/S-GW) (340). The base station 310 may then send an RCCConnectionSetup message over the control channel to the WTRU 305 (345).

The WTRU 305 may include a response IE in an RRCConnectionSetupComplete message, which may be sent over a dedicated control channel to the base station 310 (350). The base station 310 may then send an MBMS service status report with a response IE to the MCE 315 (355).

Since the "report MBMS status" cause code was sent, the base station 310 may know that the connection establishment was used for reporting the MBMS service query response. The base station 310 may then release the RRC connection, (i.e., disconnect the WTRU connection) (360) and may send an RCCConnectionRelease message over the dedicated control channel to the WTRU 305 (365), which then returns to the idle mode (370).

In another mechanism, a query response MAC CE may be defined in the UL direction so that connected mode WTRUs may send the MBMS query response on any of the WTRU UL transmission occasions if there is enough room, (this may increase the UL transmission chances for the connected mode WTRUs). In this instance, enough room may refer to whether the network allocated uplink transmission grant has allocated enough UL transmission data space or resources for the transmission occasion.

In another mechanism, instead of idle mode WTRUs establishing an RRC connection to transmit the query response, the WTRU may delay the idle mode WTRU response until there are NAS or RRC UL occasions. This refers to the NAS periodic tracking area updates (TAUs) or other NAS/RRC periodical UL message transmission occasions.

For example, the WTRU may construct a query response NAS IE or a RRC IE with respect to the MBMS report and append it to the NAS TAU or other NAS messages. The WTRU may also append it to the RRC ULInformationTransfer message transmitted at the periodic TAU time or other NAS periodic update message occasions.

In another example, the WTRU may determine whether to use the "delay" method based on the knowledge of the next periodic TAU occasion from the time an MBMS service response is generated. If the "delay until TAU time" is less than a predefined time or within the network query/polling period, then the delay method may be used to reduce the network traffic and RACH contention, while still accomplishing the response.

Described herein are mechanisms for service reception start/stop follow-up report. It is possible that a WTRU/user may change a specific MBMS service reception status after the WTRU/user has responded to the network queries about the service reception status. For example, a WTRU may begin receiving a service it previously reported as not receiving, not being interested in or subscribed, or a WTRU may stop the reception of a service it previously reported as receiving, or a combination of these for different services, i.e., stopping one in reception and starting another one previously just interested or subscribed.

In these cases, it may be useful for the WTRU to send a prompt report of the change in the reception status to the network provider. It may also be useful for the WTRU to report a change in reception status if the time is still within the configured or default follow-up-report-time-range.

Other conditions that may warrant a prompt report, (with or without the report-time-range definition above), may include the network indicating that the involved MBMS services need a prompt-start/stop-event-report, the WTRU reporting this service status previously, or both.

The WTRUs in connected mode may report this event with an MBMS-query-response-IE in any of the RRC UL messages that supports it or in a MAC CE UL for the query response.

The WTRUs in idle mode may report this event using the mechanisms described earlier herein for idle mode.

In order to prevent the WTRU from sending MBMS service status too often, and potentially overflowing the network traffic, a prohibit timer may be configured in the WTRU. The timer may be set or reset whenever a status report is sent. The WTRU may not send another status report until the prohibit timer expires. To guard against the service switching too often to trigger the status report, a service selection stabilize timer may be configured in the WTRU. The timer may be set or reset whenever a service selection/deletion is made. The triggering of a status report is held off until the stabilize timer expires.

The timers may be predetermined or configured by the network when the network configures or enables the prompt-start/stop-event report.

Described herein are mechanisms for WTRU general MBMS services status reports. Another method of obtaining the MBMS service status may be that the network polls for the general interest in all MBMS services by the WTRUs in the area.

The general MBMS service status report poll may be activated by the network, or it may be a default operation mode in a mixed cell defined for MBMS-interested WTRUs.

The general reporting mode may be activated by the network by setting a flag in the system information or in a MCCH message or in a DCI format such as one associated with the MQ-RNTI or the M-RNTI. The flag may be associated with a defined reporting period within which a WTRU may report its MBMS service status, for example, once within that period. Instead of, or in addition to, a flag, the poll may be present as a poll-tag-number, where the WTRU may send this poll-tag-number together with the WTRU report. The activation may be explicitly turned off by removing the polling indicator, (the flag or the poll-tag-number), by sending a deactivation indicator in a message (MCCH message) or in the DCI format such as one associated with the M-RNTI or the MQ-RNTI.

The general reporting request may be a default action that the specification may ask the MBMS WTRUs to report its service status at appropriate occasions.

For a connected mode WTRU, the reporting of the MBMS service status may be applicable if the WTRU MBMS reception is active, i.e. if a service is currently being received or a service transmission is sought by monitoring the MCCH message change. It may also apply to WTRUs in idle mode if the MBMS reception, (and/or monitoring), is active.

A general reporting may not be required if the WTRU MBMS reception or monitoring is not active.

Described herein are mechanisms for addressing time scope and area scope of service status reports. The general MBMS service status, (or other polled status), report may have a time-scope and/or a MBSFN-area scope.

For example, a WTRU may perform the general MBMS status report once per a predefined or a configured period or per the presence of an activation flag or other polling indication. The WTRU may append a time-stamp and/or a poll-tag-number with the report to indicate the designated period. The time-stamp and/or the poll-tag-number value may be indicated in the system information (SI), MCCH message or the DCI format associated with the MQ-RNTI or M-RNTI.

In another example, the WTRUs may report the service status per one MBSFN area. Typically this may be the MBSFN area from which the WTRU is receiving the MBMS services or intends to receive MBMS services. The WTRU may also append the MBSFN-area-ID in its general MBMS status report. If the WTRU is changing the MBSFN area, or the WTRU intends to change the MBSFN area, the WTRU may report to the new area with its general MBMS service status.

In another example, the WTRUs may update its general MBMS status report if its MBMS service status, (i.e., subscription status, reception status, or intention to receive), has changed, including automatic subscription expiry and new subscription enabled. The WTRU may need to indicate the purpose of update in the report.

Described herein is the content of the general MBMS service status report. In a general MBMS service report, a WTRU may report one or more of the following: 1) all subscribed MBMS services by the WTRU/user; 2) the MBMS services the WTRU is currently receiving; or 3) the MBMS services the WTRU/user is "interested in receiving". A separate report may be used for each type of status. One report may be used for reporting multiples types of status.

If the poll may be for one of the above types of status, the WTRU may send a report in the form of a service ID list. If the network poll is for more than one type of status, the WTRU may report in one or more of the following formats: 1) in the format of a list of the service-ID or equivalents and a service-status-indicator for those WTRU relevant MBMS services; or 2) a query category along with, (i.e., followed by), a list of the service identities for the polled query category.

The WTRU may also report one or more of the following together with the other report parameters to facilitate the MBMS operator to collect and evaluate the reports. For example, the report may include the currently experienced reception quality such as the received signal+interference to noise ratio (SINR), reference signal received quality (RSRQ), the received block error rate (BLER) and/or other high level quality indicators. The report may also include, for example, location information of the WTRU.

Described herein are general MBMS status report reporting mechanisms. The WTRU may use one or more of the following mechanisms to send the general MBMS status report. In one mechanism, a special MBMS report message in the UL may be defined for this general report at the NAS or RRC protocol level. For example, connected mode WTRUs may use an approach such that a new NAS or RRC message may be used to transmit the status report at any time. Idle mode WTRUs may use an approach such that a new NAS message for MBMS service status report may be piggybacked to a RRCConnectionSetupCommplete message or a new RRC message for MBMS service status report may be piggybacked to, may replace or may be sent right after the RRCConnectionSetupComplete message.

In another mechanism, a special set of MBMS report IEs may be defined to be appended to one or more of the NAS or RRC UL messages. In this case, the connected mode WTRUs may use an approach such that the WTRU may include the report IE(s) in any UL RRC messages that support the IE. The idle mode WTRUs may use an approach such that the WTRU may include the report IE(s) in the RRCConnectionSetupComplete message.

In another mechanism, the WTRU may delay the idle mode WTRU response until there is a NAS or a RRC UL occasion.

In another mechanism, a special MAC CE in the UL may be defined for this general report. In this case, the connected mode WTRUs may use an approach to send the general MBMS status report in the newly defined MAC CE.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented by a wireless transmit/receive unit (WTRU), of providing multimedia broadcast multicast services (MBMS) service status feedback, the method comprising:
   receiving an MBMS service status query message over an MBMS control channel;
   generating a report with MBMS service identifier index values, wherein each MBMS service identifier index value indicates a position of a service identifier in a counting or query list corresponding to an MBMS service that the WTRU is receiving or intending to receive; and
   transmitting an MBMS service status response message.

2. The method of claim 1, wherein the MBMS service status query message and the MBMS service status response message are radio resource controller messages.

3. The method of claim 1, wherein the MBMS service query message is received along with a MBSFNAreaConfiguration message.

4. The method of claim 3, wherein the WTRU decodes the MBSFNAreaConfiguration message first on a condition that the MBMS service status query message is received together with the MBSFNAreaConfiguration message.

5. The method of claim 4, wherein the MBMS service identifiers are for counting or query of MBMS services that the WTRU is receiving or intending to receive.

6. The method of claim 1, wherein the MBMS service status query message includes at least a list of MBMS service identifiers.

7. The method of claim 1, wherein the MBMS service status response message is transmitted within at least one of a predetermined or configured time limit.

8. A wireless transmit/receive unit (WTRU) for providing multimedia broadcast multicast services (MBMS) service status feedback, comprising:
   a receiver configured to receive an MBMS service status query message over an MBMS control channel;
   a processor in communication with the receiver and a transmitter, the processor configured to generate a report with MBMS service identifier index values, wherein each MBMS service identifier index value indicates a position of a service identifier in a counting or query list corresponding to an MBMS service that the WTRU is receiving or intending to receive; and
   the transmitter configured to transmit an MBMS service status response message.

9. The WTRU of claim 8, wherein the MBMS service status query message and the MBMS service status response message are radio resource controller messages.

10. The WTRU of claim 8, wherein the MBMS service query message is received along with a MBSFNAreaConfiguration message.

11. The WTRU of claim 10, wherein the WTRU decodes the MBSFNAreaConfiguration message first on a condition that the MBMS service status query message is received together with the MBSFNAreaConfiguration message.

12. The WTRU of claim 8, wherein the MBMS service status query message includes at least a list of MBMS service identifiers.

13. The WTRU of claim 12, wherein the MBMS service identifiers are for counting or query of MBMS services that the WTRU is receiving or intending to receive.

14. The WTRU of claim 8, wherein the MBMS service status response message is transmitted within at least one of a predetermined or configured time limit.

15. A method, implemented at a network, for providing multimedia broadcast multicast services (MBMS) service status feedback, comprising:
   forming an MBMS service status query message;
   scheduling transmission of the MBMS service status query message;
   transmitting an MBMS service status query message over an MBMS control channel; and
   receiving an MBMS service status response message, wherein the MBMS service status response message includes a a report with MBMS service identifier index values, wherein each MBMS service identifier index value indicates a position of a service identifier in a counting or query list corresponding to an MBMS service that the WTRU is receiving or intending to receive.

16. The method of claim 15, wherein the MBMS service query message is tranmitted along with a MBSFNAreaConfiguration message.

17. The method of claim 15, wherein the MBMS service status query message includes at least a list of MBMS service identifiers, further wherein the MBMS service identifiers are for counting or query of MBMS services that the WTRU is receiving or intending to receive.

18. A system for providing multimedia broadcast multicast services (MBMS) service status feedback, comprising:
   a network entity having a receiver, transmitter and a processor, the processor configured to communicate with the transmitter and receiver;
   the processor configured to form an MBMS service status query message and schedule transmission of the MBMS service status query message;
   the transmitter configured to transmit an MBMS service status query message over an MBMS control channel; and
   a wireless transmit/receiver unit receiver configured to transmit an MBMS service status response message, wherein the MBMS service status response message includes a report with MBMS service identifier index values, wherein each MBMS service identifier index value indicates a position of a service identifier in a counting or query list corresponding to an MBMS service that the WTRU is receiving or intending to receive.

* * * * *